Sept. 25, 1928.  
W. C. DWYER  
1,685,278  
COMBINED DISK AND TOOTHED HARROW  
Filed Oct. 31, 1923  2 Sheets-Sheet 1

Inventor:
William C. Dwyer,
By W. P. Daniel,
Atty.

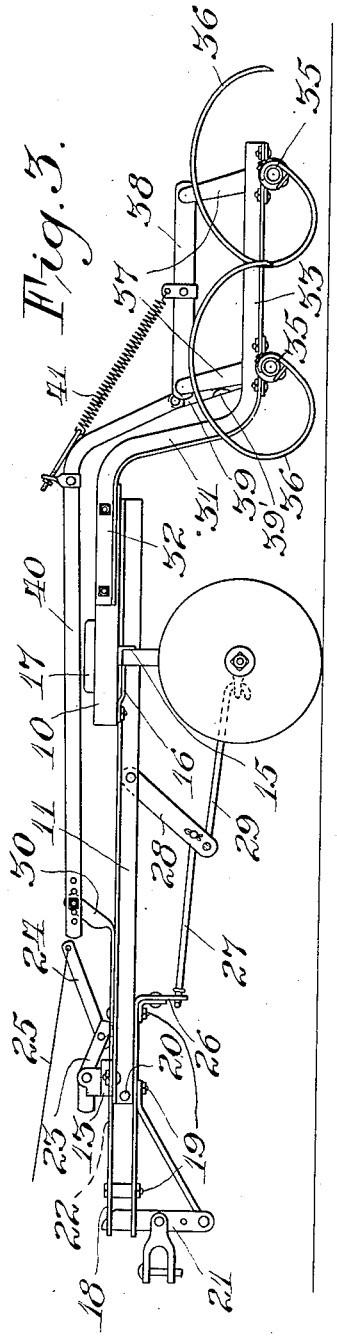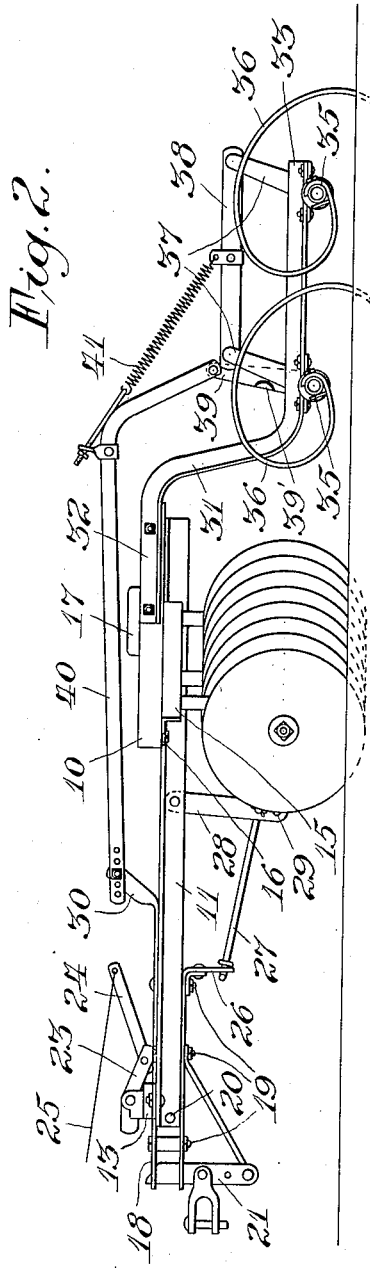

Patented Sept. 25, 1928.

1,685,278

UNITED STATES PATENT OFFICE.

WILLIAM C. DWYER, OF AUBURN, NEW YORK, ASSIGNOR TO INTERNATIONAL HARVESTER COMPANY, OF CHICAGO, ILLINOIS, A CORPORATION OF NEW JERSEY.

COMBINED DISK AND TOOTHED HARROW.

Application filed October 31, 1923. Serial No. 671,862.

This invention relates to harrows and is directed to improvement in the construction of combination harrows and, more particularly, to the mechanism for controlling the operation thereof.

The objects of the invention are to provide a toothed harrow attachment capable of being combined with a disk harrow of ordinary type and to provide adjusting mechanism for the combined implements that will be operable by the tractive power. A further object is to provide a toothed harrow attachment that will not interfere with backing of the implement during operation. To accomplish this, a disk harrow and a special toothed harrow have been combined in a novel manner, so that the mechanisms for angling the disks and shifting the harrow teeth are made to operate in unison by application of the draft power thereto, as will be more particularly described hereinafter and claimed.

On the drawings accompanying the application, Fig. 1 is a plan view of the compound harrow;

Fig. 2 is a side view showing the implements in working position; and

Fig. 3 is a similar view with the implements in position for transport.

Figure 1:
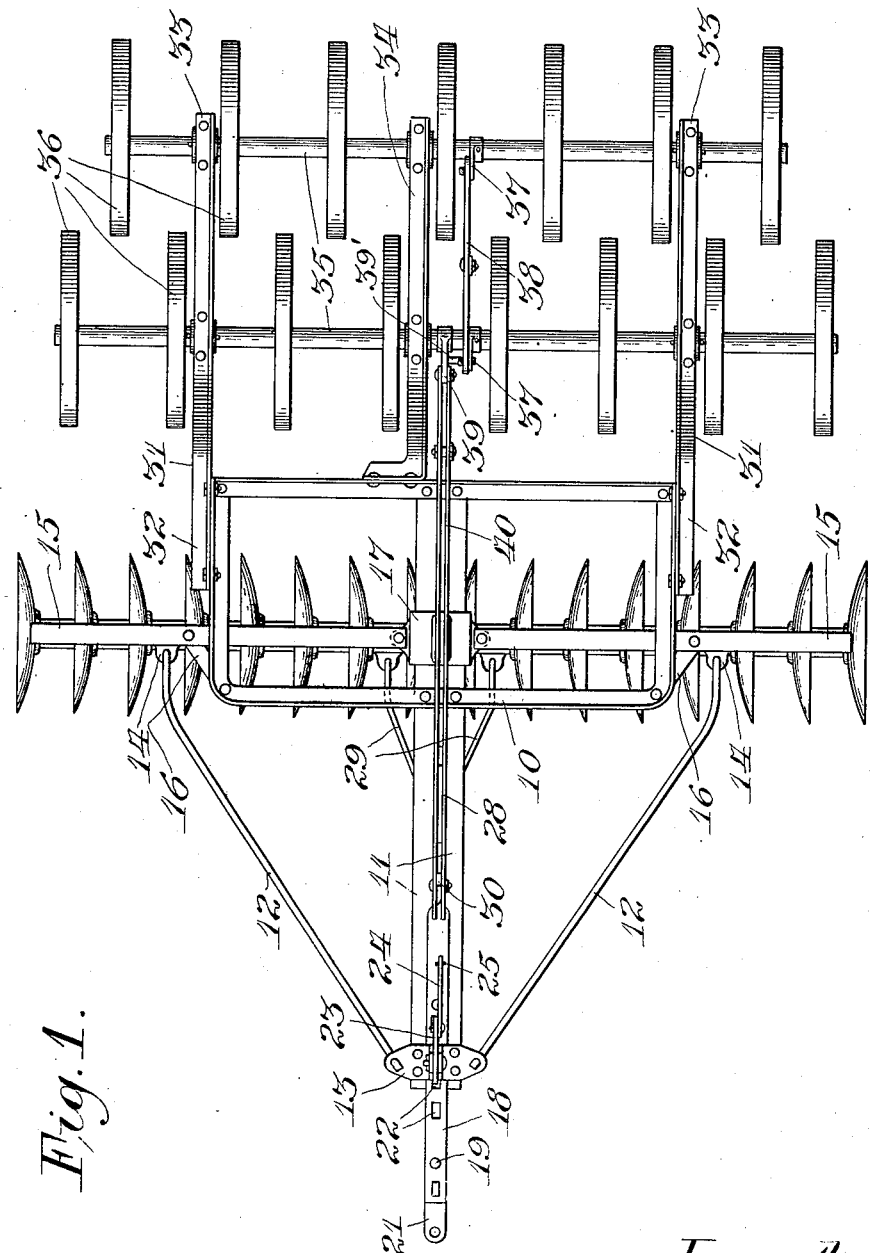

As shown in the drawings, the invention, broadly, comprises a compound harrow, the front section of which consists of a disk harrow having a substantially rectangular frame 10, on which is secured a forwardly extending draft frame comprising a pair of spaced angle bars 11, which are braced by bars 12 extending from a plate 13 secured on the frame ends of the angle members to lugs 14 on the gang frames. The gang frames 15 are pivoted to the frame 10 through the medium of links 16 and their inner ends are pivotally connected by a saddle piece 17, which is adapted to travel back and forth on the rear ends of the angle members 11 as the disk gangs are shifted to and from working position. A slidable draft-head 18 is mounted on the forward ends of the angle members 11 and comprises upper and lower bars engaging the angle members above and below and connected by spacing bolts 19, two of which are positioned in the space between the angle members 11, and the third one beyond the ends of the angle members, so that the middle and outer bolts serve as stops limiting the fore and aft movement of the draft-head as they engage the transverse bolt 20 connecting the outer ends of the angle members. The draft-head 18 carries the usual clevis 21 at its forward end, and the upper bar which passes under the plate 13 is provided with a series of openings or notches 22, which are adapted to be engaged by the end of a spring pressed latch member 23, which is pivoted on the plate 13 and has a cam arm 24 pivoted to it in such manner that a pull on the cord 25 connected to the end of this arm serves to lift the latch to release the draft-head so that it may be drawn outwardly. The lower bar of the draft-head 18 is bent downwardly as at 26 and has an opening in which is fastened the forward end of the rod 27, that has its rear end pivoted to a swinging arm 28, to the end of which there are connected the two angling links 29 attached to the inner ends of the disk gangs. The upper bar of the draft-head 18 is formed with a rearward extension which is bent upwardly, as at 30, for the purpose to be described.

The harrow construction so far described is of a well-known type and forms no part of the present invention except as it co-operates with the novel construction now to be described.

With the disk harrow just described there is combined as a rear extension or section an auxiliary tillage device adapted to harrow and level the soil turned by the disks, the attachment being in this instance shown as a spring-toothed harrow consisting of a pair of outer bars 31 having offset upper and lower parallel portions 32 and 33, with the portions 32 bolted or otherwise secured to the sides of the harrow frame 10 and the portions 33 extending rearwardly in proximity to the ground; preferably, a similarly shaped central bar 34 secured to the rear member of the harrow frame is also employed. The end portions 33 of bars 31 have journaled thereon a series of shafts 35 carrying the spring harrow teeth 36. Each shaft 35 has secured to it an upwardly extending arm 37 and these arms are pivotally connected by a link 38, so that the shafts 35 will rock together. A depth regulating arm 39 is pivoted on the forward shaft 35 at one side of the forward arm 37 and has a laterally extending lug 39' adapted to be engaged by the forward edge thereof, forming a stop which limits oscillation of arms 37 and shafts 35 in a forward direction. Arm 39 has pivoted to it the rear end of an adjusting bar 40 which has its forward end adjustably connected, as by a series of openings, to the upwardly extending end 30 of the draft-head heretofore described. The rear end of the bar 40 is preferably bent downwardly as shown in Figs. 2 and 3, and a coil spring 41 is attached to this bar near its angle and to bar 38 and serves to rock the shafts 35 to raise the harrow teeth 36 from the ground when bar 40 moves forwardly, its tension also tending to hold the forward arm 37 against stop 39'. Adjustment of the connection of bar 40 to the end 30 of the draft-head determines the working depth of teeth 36.

In operation it will be clear from the above description that shifting of the draft-head 18 by a backward or forward movement of the tractor will serve to angle or straighten the disk gangs in the usual way and that the movement of the draft-head will be transmitted through the bar 40 and link 38 to the shafts 35, causing them to rock for either lowering or raising the harrow teeth as the disk gangs are moved into either working or non-working position. It will also be evident that when the entire implement is backed with teeth 36 in the soil, the spring 41 will yield and allow the teeth to turn or roll under the supporting shafts, making backing easier, while the spring will return them to proper position when forward motion is resumed.

While the above disclosure exemplifies the preferred form of the invention, it is obvious that it is capable of considerable variation within the scope of the following claims.

What is claimed is:

1. A compound harrow comprising a frame, angularly adjustable gangs of harrow disks, a series of harrow teeth mounted on the frame behind the disk gangs and extending across the path thereof, means carried by said frame for supporting said teeth, said means being rotatable with respect to the frame to permit movement in a vertical plane of the points of the teeth relaitvely to the frame, and means on the frame common to the disk gangs and the harrow teeth for simultaneously shifting the disk gangs horizontally and the teeth vertically and comprising a slidable draft head on the forward end of the frame movable back and forth by draft power, means for connecting said draft head to the disk gangs and separate adjustable means for connecting the draft head to the supporting means for the harrow teeth, said draft head being operable to simultaneously straighten the disk gangs and lift the harrow teeth and to simultaneously angle the disk gangs and lower the harrow teeth.

2. An attachment for disk harrows of the adjustable pivoted gang type, comprising bars having upper and lower straight offset portions, said upper portions being adapted for attachment to the harrow frame with the lower portions extending rearwardly in proximity to the ground, a shaft journaled on the lower portions, a series of soil working tools secured thereto, an arm pivoted on the shaft, means limiting pivotal movement of said arm independently of the shaft in one direction, and an adjusting link connected to the arm and adapted for connection to the gang adjusting mechanism of the disk harrow.

3. An attachment for disk harrows of the adjustable pivoted gang type comprising bars having upper and lower straight offset portions, said upper portions being adapted for attachment to the harrow frame with the lower portions extending rearwardly in proximity to the ground, a vertically shiftable series of soil working tools carried by said arms and means for adjusting the tools including an operating link connected thereto and adapted for connection to the gang adjusting mechanism of the disk harrow.

4. An attachment for disk harrows of the type having pivoted disk gangs and traction actuated mechanism for angling the gangs, said attachment comprising a frame adapted for attachment to the harrow frame and carrying vertically shiftable earth working tools, and means for shifting said tools including a member adapted for connection to the traction actuated angling mechanism of the harrow.

5. An attachment for disk harrows of the type having pivoted disk gangs and traction actuated mechanism for angling the gangs including a sliding draft head on the harrow frame, said attachment comprising a frame having parts adapted for attachment to the harrow frame, vertically shiftable earth working tools carried by the attachment frame, means for shifting the tools including a rock arm, and a lift actuating connection attached to the rock arm at one end and having means at its other end for adjustable connection to the draft head on the harrow.

In testimony whereof I affix my signature.

WILLIAM C. DWYER.